United States Patent [19]

Brown et al.

[11] Patent Number: 5,371,897
[45] Date of Patent: Dec. 6, 1994

[54] METHOD FOR REQUESTING IDENTIFICATION OF A NEIGHBOR NODE IN A DATA PROCESSING I/O SYSTEM

[75] Inventors: Paul J. Brown; Kenneth J. Fredericks, Sr.; Eugene P. Hefferon, all of Poughkeepsie, N.Y.; Gerald T. Moffitt, San Jose, Calif.; Allan S. Meritt, Poughkeepsie, N.Y.

[73] Assignee: International Business Machines Corporation, Armonk, N.Y.

[21] Appl. No.: 750,356

[22] Filed: Aug. 27, 1991

[51] Int. Cl.⁵ ............................................. G06F 13/00
[52] U.S. Cl. ................... 395/800; 395/275; 364/228.4; 364/230; 364/242.94; 364/242.96; 364/242.5; 364/DIG. 1
[58] Field of Search .............. 395/800, 200, 275, 650; 364/DIG. 1, DIG. 2, 228.4, 230, 242.94, 242.96, 242.5

[56] References Cited

U.S. PATENT DOCUMENTS

| | | | |
|---|---|---|---|
| 3,693,161 | 9/1972 | Price et al. ............................ | 395/275 |
| 4,360,870 | 11/1982 | McVey ................................. | 395/275 |
| 4,399,531 | 8/1983 | Grande et al. ....................... | 370/60 |
| 4,589,063 | 5/1986 | Shah et al. ........................... | 395/275 |
| 4,638,313 | 1/1987 | Sherwood, Jr. et al. ........ | 340/825.52 |
| 4,646,235 | 2/1987 | Hirosawa et al. .................. | 395/275 |
| 4,677,588 | 6/1987 | Benjamin et al. .................. | 395/325 |
| 4,912,461 | 3/1990 | Cenzano, Jr. et al. .......... | 340/825.52 |
| 4,939,726 | 3/1990 | Flammer et al. ................... | 370/94.1 |
| 4,939,728 | 7/1990 | Markkula, Jr. et al. ............ | 370/94.3 |
| 4,941,089 | 7/1990 | Fischer ................................. | 395/325 |
| 4,953,072 | 8/1990 | Williams ............................. | 395/725 |
| 5,003,508 | 3/1991 | Hall ..................................... | 395/325 |
| 5,042,027 | 8/1991 | Takase et al. ....................... | 370/54 |
| 5,048,014 | 9/1991 | Fischer ................................. | 370/85.5 |
| 5,107,489 | 4/1992 | Brown et al. ....................... | 370/58.2 |
| 5,175,765 | 12/1992 | Perlman .............................. | 380/30 |
| 5,206,860 | 4/1993 | Brown et al. ....................... | 371/20.1 |

FOREIGN PATENT DOCUMENTS 0281534  7/1988  European Pat. Off. .
0474373  11/1992  European Pat. Off. .

OTHER PUBLICATIONS

Proceedings of the 1984 International Conference on Parallel Processing 21, Aug. 1984, Livermore pp. 356–358, Kung & Shacham A Distributed Limited-Depth Probing Protocal for a Network with Changing Topology.

Primary Examiner—Alyssa H. Bowler
Assistant Examiner—Dzung C. Nguyen
Attorney, Agent, or Firm—Bernard M. Goldman

[57] ABSTRACT

A method for acquiring the node identifier of a node in a data processing input/output (I/O) system having a plurality of nodes. This procedure is part of the initialization of each node in the I/O system and may be used to establish the configuration of the I/O system such that if a connection breaks or a fault occurs between nodes, the configuration can be confirmed after the break or fault is corrected. This prevents data from being sent to the wrong device if lines were connected in a different configuration during the correction of a fault. The node identifier is a worldwide-unique identifier such that only one node is identified by a node identifier. The node identifier contains a validity code that specifies if the node identifier is valid. Also disclosed is a retry procedure for retrying the acquisition of a node identifier if the acquired node identifier is not valid, and a deferral procedure which defers the retry procedure if a link is not available.

9 Claims, 5 Drawing Sheets

| 13 00 00 88 00 00 00 3C |
|---|
| 0                                                7 |

FIG. 6

| BYTE | |
|---|---|
| 0 | 1000 0080 0000 0000 0000 0000 0000 0000 |
| 16 | 0000 0000 0000 0000 0000 0000 0000 0000 |
| 32 | NODE DESCRIPTOR |
| 48 | |

FIG. 12

| WORD | | | |
|---|---|---|---|
| 0 | FLAGS | NODE PARAMETERS | |
| 1 | TYPE NUMBER | | |
| 2 | TYPE NUMBER (C) | MODEL NUMBER | |
| 3 | MN (C) | MANUFACTURER | |
| 4 | PLANT OF MFG. | SEQUENCE NUMBER | |
| 5 | SEQUENCE NUMBER (CONTD.) | | |
| 6 | SEQUENCE NUMBER (CONTD.) | | |
| 7 | SEQUENCE NUMBER(C) | TAG | |

METHOD FOR REQUESTING IDENTIFICATION OF A NEIGHBOR NODE IN A DATA PROCESSING I/O SYSTEM

BACKGROUND OF THE INVENTION

The present invention relates to the identification of a node in a data processing input/output system, and more particularly relates to the identification of a neighboring node during the definition of a data processing input/output system.

Many times in the operation of a data processing input/output (I/O) system, it is desirable to know the identity of the neighboring node. Such information is particularly helpful in such applications as reporting a broken data transmission line or in selecting an alternate route through an I/O network to avoid a fault or suspected fault.

U.S. Pat. No. 3,693,161 to Price et al. issued Sept. 19, 1972 for Apparatus for Interrogating the Availability of a Communication Path to a Peripheral Device and discloses a computer system in which one or more processors interrogate the input/output system to determine whether communication paths are available to the respective peripheral units. A particular peripheral unit is identified by a coded signal from a processor.

U.S. Pat. No. 4,360,870 to McVey issued Nov. 23, 1982 for Programmable I/O Device Identification and discloses a computer system in which each I/O device is loaded with a unique assigned identifier. The identifiers are assigned in an ordered priority by device type.

U.S. Pat. No. 4,589,063 to Shah et al. issued May 13, 1986 for Data Processing System Having Automatic Configuration and discloses a method and apparatus for automatic configuration of a computer system. One or more of several I/O devices are interfaced to the system through I/O boards that plug into various option slots in a system motherboard Each of the I/O devices includes a controlling device driver module. Each driver module is self-identifying.

U.S. Pat. No. 4,638,313 to Sherwood, Jr. et al. issued Jan. 20, 1987 for Addressing for a Multipoint Communication System for Patient Monitoring and discloses a method for dynamically assigning addresses to new modules as they are coupled to a communication system. At power up, a process is disclosed which is used by a primary station to assign an address to each module in an order derived from the serial number of the module.

U.S. Pat. No. 4,939,726 to Flammer et al. issued Jul. 3, 1990 for Method for Routing Packets in a Packet Communication Network and discloses a packet network method and system in which each node in the network is uniquely identified by absolute geographical coordinates or by a code indicating absolute location in an external coordinate-based reference system.

U.S. Pat. No. 4,953,072 to Williams issued Aug. 28, 1990 for Node For Servicing Interrupt Request Messages on a Pended Bus and discloses an interrupt servicing node whose ID is generated using a unique set of wires from the backplane that are hardcoded with the particular ID for the slot in which the node resides.

U.S. Pat. No. 5,003,508 to Hall issued Mar. 26, 1991 for Linear Nearest Neighbor Interconnect Bus System and discloses an apparatus for providing data communication between concurrently operating random access memory and processing devices including a set of interface nodes interconnected in series by bidirectional buses. Each node also includes means for receiving data from any nearest neighbor node to which it is connected, and to forward to nearest neighbor nodes messages generated by a processing device to which it is connected.

SUMMARY OF THE INVENTION

In a computer I/O system having a plurality of nodes, it is many times useful to identify one of the nodes, particularly the nearest neighbor, in such applications as identifying faults or establishing or verifying the configuration of the I/O system. For instance, if a fault is detected, it is desirable to confirm that the configuration has not been changed after the fault is corrected to be sure data is being sent to a desired device. This is necessary in that links between nodes may have inadvertently been connected differently between nodes in correcting a fault such that nodes are no longer connected in the same configuration as before the fault occurred. Thus in an initialization procedure, each node obtains the node identifier of its nearest neighbor by sending out a request-node-identifier frame which is responded to by an identifier-response frame from the neighbor. The identifier-response frame contains a worldwide-unique identifier with identifies the neighboring node.

It is therefore an object of the present invention to provide a method for obtaining an identifier of a node in a computer I/O system.

It is another object of the present invention to provide a worldwide-unique identifier for each node in a computer I/O system.

It is another object of the present invention to provide an validity code in a node identifier which indicates if a node identifier is valid or not valid.

It is another object of the present invention to provide a retry procedure for retrying the acquisition of a node identifier if the acquired node identifier is not valid.

It is another object of the present invention to provide a procedure for deferring the retrying of the acquisition of a node identifier when the procedure is unsuccessful.

The foregoing and other objects, features and advantages of the invention will be apparent from the following more particular description of the preferred embodiment of the invention as illustrated in the drawings.

DESCRIPTION OF THE PREFERRED EMBODIMENTS

Figure 1:
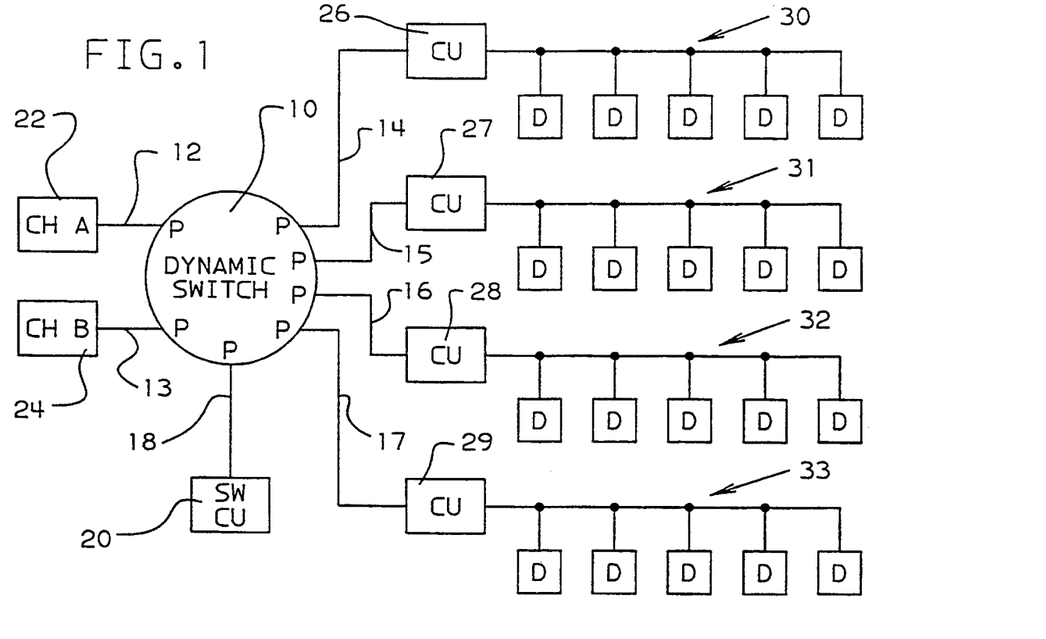
FIG. 1 is a block diagram of the I/O system of a data processing system which uses the present invention.

FIG. 1 is a block diagram of the I/O system of a data processing system for making dynamic connections between the channel subsystem of the data processing system and control units. The I/O system includes a dynamic switch 10 having a plurality of ports P, each port P connected to one end of a plurality of links 12–18. One of the links 18 is connected to a dynamic switch control unit 20, and each of the other links 12–17 is connected to either a channel, such as channel A designated 22 or channel B designated 24, or to one of the control units 26–29. Each of the control units 26–29 control a plurality 30–33 of peripheral devices D, respectively.

Each of the channels 22 and 24 is a single interface on a System/370, a 370/XA, or an ESA/390 subsystem. The channels 22 and 24 direct the transfer of information between I/O devices of the pluralities 20–33 of devices D and main storage (not shown) of the data processing system and provide the common controls for the attachment of different I/O devices D by means of a channel path (to be defined). The channels 22 and 24 are serial channels wherein data is transmitted and received in a serial format, as explained in U.S. patent application Ser. No. 07/429,267 filed Oct. 30, 1989 for Switch and Its Protocol for Making Dynamic Connections, owned by the assignee of the present invention and incorporated herein by reference.

Each of the links 12–17 is a point-to-point pair of conductor that may physically interconnect a control unit and a channel, a channel and a dynamic switch (such as links 12 and 13), a control unit and a dynamic switch (such as links 14–17), or, in some cases, a dynamic switch and another dynamic switch (not shown). The two conductors of a link provide a simultaneous two-way communication path, one conductor for transmitting information and the other conductor for receiving information. When a link attaches to a channel or a control unit, it is said to be attached to the I/O interface of that channel or control unit. When a link is attached to a dynamic switch, it is said to be attached to a port P on that dynamic switch. When the dynamic switch makes a connection between two dynamic-switch ports, the link attached to one port is considered physically connected to the link attached to the other port, and the equivalent of one continuous link is produced for the duration of the connection.

The dynamic switch 10 provides the capability to physically interconnect any two links that are attached to it. The link attachment point on the dynamic switch 10 is the dynamic-switch port P. Only two dynamic-switch ports P may be interconnected in a single connection, but multiple physical connections may exist simultaneously within the same dynamic switch. The interconnection of two dynamic-switch ports P established by the dynamic switch 10 does not affect the existing interconnection of any other pair of dynamic-switch ports, nor does it affect the ability of the dynamic switch to remove those connections.

When a connection is established, two dynamic switch ports and their respective point-to-point links are interconnected by a switch matrix within the dynamic switch 10 such that the two links are treated and appear as one continuous link for the duration of the connection. When frames are received by one of two connected switch ports P, the frames are normally passed from one port to the other for transmission on the other port's link.

The dynamic switch 10 can form a connection between two ports P in one of two ways: dynamic or static. The connection is termed a dynamic connection or static connection, accordingly.

In the disclosed embodiment, the dynamic switch 10 can establish or remove a dynamic connection between two ports P based on the information provided by certain frame delimiters in the serial frames transmitted over the links and based on conditions present at each of these ports P.

The dynamic switch can establish or remove a static connection between two ports P as a result of commands received by means of the local or remote facilities of the dynamic-switch control unit 20. Frame delimiters or other sequences received at the port P have no effect on the static connection.

When a static connection exists between two ports P, the ports are in the static state. The static state is not affected by any information received from the link or from the statically connected port. If a sequence (to be explained) is received by one of two statically connected ports, the received sequence is normally retransmitted on the connected port's link. Frames may be received and transmitted simultaneously by statically connected ports.

In one embodiment, the dynamic switch 10 may have a maximum of 254 ports P. Since it takes two ports to make a connection, the maximum number of possible simultaneous connections is equal to half the number of ports P implemented. It will be understood that if the quantity of ports P is an odd number, then the maximum is half of the maximum number of ports P less one. A port P does not have a link address and, therefore, is not uniquely addressable. However, an association between a port P and either a destination link address or a source link address is provided by the dynamic switch.

The dynamic switch 10 has one dynamic-switch control unit 20, which is assigned the unique link address of its link 18. The dynamic-switch control unit 20 is connected to the dynamic switch 10 as though it were attached to the dynamic switch by means of a port P and is available for dynamic connections like any other control unit attached to the dynamic switch 10. Through facilities provided by the dynamic-switch control unit 20, changes can be made to information in a matrix controller of the dynamic switch 10 concerning an individual port P which alters the ability of that port to be dynamically connected with another port.

Figure 2:
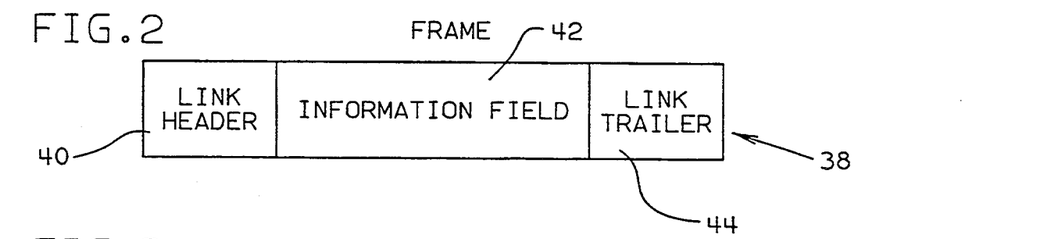
FIG. 2 illustrates a frame for transmitting data in the I/O system of FIG. 1.

As previously mentioned, information is transferred on the serial-I/O interface in a frame. A frame is a unit of information that is sent or received according to a prescribed format. This format delineates the start and end of the unit of information and prescribes the placement of the information within these boundaries. FIG. 2 shows the basic frame format 38 which consists of a fixed-length link-header field 40, a variable-length information field 42, and a fixed-length link-trailer field 44.

Communications using the switch are governed by two hierarchical levels of functions and serial-I/O protocols, the link level and the device level. Link level protocols are used whenever a frame is sent. These protocols determine the structure, size, and integrity of the frame. Link protocols also provide for making the connection through the dynamic switch 10 and for other control functions which are unrelated to this invention. Each channel and each control unit contains a link-level facility, which is the embodiment of the link protocols, as explained in U.S. patent application Ser. No. 07/575,923 filed Aug. 31, 1990 for Managing a Serial Link in an I/O System, owned by the assignee of the present invention and incorporated herein by reference. The device level is used to convey application information such as the data which is transferred from an input-output device to the channel. A frame which contains application information or controls is called a device-level frame. A frame which is used solely for link level protocol is called a link-control frame.

Each link-level facility is assigned a unique address, called the link address. The assignment of a link address to a link-level facility occurs when the link-level facility performs initialization. Every frame sent through the switch contains link-level addressing which identifies the source and destination of the frame. Specifically, this addressing information consists of the link addresses of the sending link-level facility (source link address) and receiving link-level facility (destination link address). The switch uses this addressing information in order to make a connection from the port receiving the frame to the correct port for sending the frame to the specified destination.

The dynamic-switch control unit 20 has a link address assigned to it for the purpose of communicating with the channels and control units attached to the switch.

With the configuration of FIG. 1, contention created by two or more switch ports P receiving a frame requiring a dynamic connection to the same switch port P and its respective link is resolved by the facilities within the dynamic switch based on the conditions present. This contention is resolved, independent of whether a channel or control unit is attached to the link from each port involved. When the contention is resolved, only one of the contending ports becomes dynamically connected to the required port, while the other contending ports indicate on their respective links that a port-busy condition exists at the dynamic switch.

If the desired connection cannot be made, the dynamic switch 10 returns a link-control response frame containing a reason code giving the reason why the connection was not made. For example, when an error is detected in a frame that initiates a connection, a link-control-frame response (referred to herein as a response frame) called dynamic-switch-port-reject is sent including a reason code which indicates that a transmission error has occurred. Some responses are generated by the ports P, and some responses are generated by the matrix controller of the dynamic switch 10.

Figure 3:
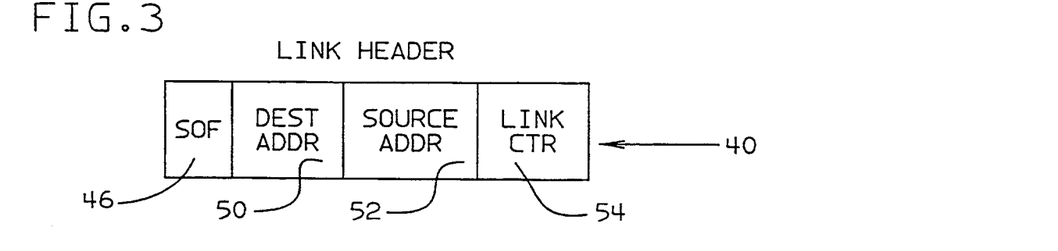
FIG. 3 illustrates a link header portion of the frame of FIG. 2.
Figure 4:
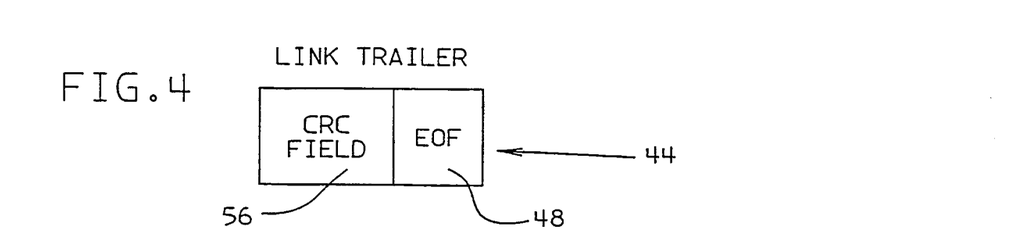
FIG. 4 illustrates a link trailer portion of the frame of FIG. 2.

FIG. 3 shows a link header 40, and FIG. 4 shows a link trailer 44. Every frame is bounded by a start-of-frame (SOF) delimiter 46 which is found in the link header 40, and an end-of-frame (EOF) delimiter 48, which is found in the link trailer 44. Frame delimiters 46 and 48 are composed of combinations of special transmission characters which do not have equivalent eight-bit data codes. In the preferred embodiment, the transmission codes used are those disclosed in U.S. Pat. No. 4,486,739 issued Dec. 4, 1984 to Franaszek et al. for Byte Oriented DC Balanced (0.4) 8B/10B Partitioned Block Transmission Code, assigned by the assignee of the present invention and incorporated herein by reference. The information contained between the frame delimiters 46 and 48 consist of data characters which have equivalent eight-bit codes as explained in the aforementioned Franaszek et al. patent.

In addition to the SOF 46, the link header 40 of FIG. 3 includes a destination-address field 50, a source-address field 52 and a link-control field 54.

As previously mentioned, the SOF 46 is a special string of transmission characters that cannot appear in the contents of an error-free frame. There are two types of SOF delimiters, the connect-SOF (CSOF) delimiter, which is used as an initiate connection control to initiate the making of a dynamic connection, and passive-SOF (PSOF) delimiter, which causes no action with respect to making a dynamic connection.

The destination-address field 50 is the first field of the contents of a frame and immediately follows the SOF delimiter 46. The destination-address field 50 identifies the link-level facility of a channel or control unit that is the destination for the frame, and is used to route the frame to the link-level facility that is the intended receiver. The destination link address 50 is used to determine which physical connection is to be made, and the destination to which the frame is to be routed through the dynamic switch 10. If no connection exists, that is, if the port P is in the inactive state, and no busy or dynamic-switch-port-reject conditions are present, the connection is made and the frame is routed to the destination port.

The source-address field 52 immediately follows the destination address field 50, and identifies the sending link-level facility.

A link-level facility provides its identity as the source of a frame by inserting its assigned link address in the source-address field 52 of any frame that it sends. After a frame is received with a valid source address 52, the source address 52 is used in most cases as the destination address in any subsequent response frame of future request frames to the same link-level facility.

The link-control field 54 indicates the type and format of the frame. The link-control field 54, which is the last field of the link header 40, immediately follows the source-address field 52. For the purposes of the present invention, the link-control field 54 indicates whether the frame is a link control frame or a device frame. When the frame is a link control frame, the link-control field 4 also indicates the function of the frame. Some of these functions are dynamic-switch-port reject, link-level reject, link-level busy, dynamic-switch port busy, and other functions necessary to report the status for link level facilities.

The information field 42 is the first field following the link header 40. The size of the information field depends on the function performed by the particular frame. The aforementioned reason code, for instance, is transmitted in the information field 42 of response frames.

The link trailer 44 includes a cyclic-redundancy-check (CRC) field 56 just before the EOF delimiter 48. The CRC field 56 contains a redundancy-check code that is used by the receiving link-level facility to detect most frame errors which affect the bit integrity of a frame. The address 50 and 52, link-control 54 and information 42 fields are used to generate the CRC 56 and are, therefore, protected by the CRC 56.

The end-of-frame (EOF) delimiter 48 is the last string of transmission characters of a frame. Again, it is a specific train of transmission characters that cannot appear in the contents of an error-free frame. When the EOF delimiter 48 is encountered during the reception of a frame, it signals the end of the frame and identifies the two transmission characters immediately preceding the EOF delimiter 48 as the CRC 56 at the end of the contents of the frame. The EOF delimiter 48 also indicates the extent of the frame for purposes of any applicable frame-length checks.

Idle characters are sent over the links when frames are not being transmitted. These idle characters, which are special characters not having data values, maintain the links in synchronism. Sequences of special idle characters are also transmitted to provide limited communication of special commands.

Each link-level facility includes a microcode controlled processor for performing the functions shown in the flow diagrams herein.

In the present invention, the request-node-identifier (RID) function provides a method for acquiring the node identifier of the recipient. The node identifier includes self-description information of a device attached to the channel path, where the point of attachment determines a node. The product that is attached to, and can provide self-description information on, one or more channel paths is referred to herein as a self-describing product (SDP). The format and content of the node descriptor is described in connection with FIG. 12 herein.

Upon accepting an RID frame, the receiving link-level facility checks whether it has a valid node identifier. The normal response is an IDR frame.

Figure 5:
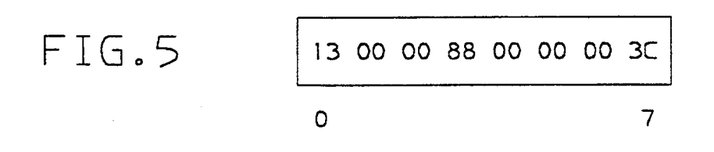
FIG. 5 shows the format and content of the information field of an RID frame of the present invention.

The eight-byte information field for the RID frame has the format shown in FIG. 5. The format of the information may or may not be checked by the recipient of the frame. When checking of the information field is performed, the contents of the information field must be the same as the defined format above. If the information field is checked and found to be different from the defined format, a link-protocol error is detected.

The identifier-response (IDR) function confirms the successful completion of the RID function, provides the unique node identifier of the responding link-level facility, and indicates the validity of the node identifier.

Figure 6:
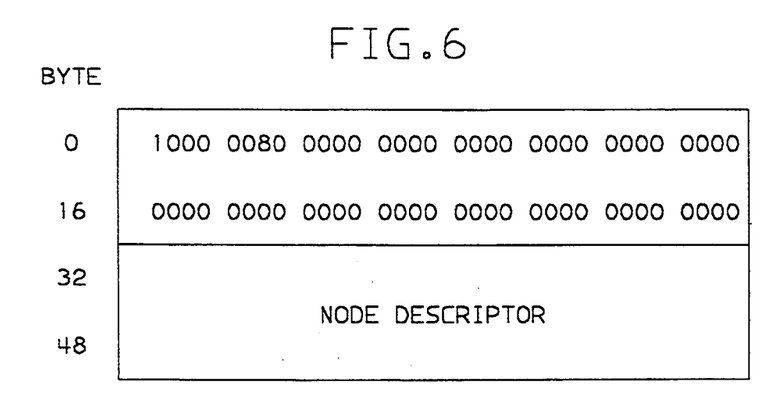
FIG. 6 shows the format and content of the information field of an IDR frame of the present invention.

The IDR frame is sent only as a response to an RID frame that is accepted. The 64 byte information field of the IDR frame is as shown in FIG. 6.

Portions of the information field may be checked by the recipient of the frame. If the recipient checks the contents of bytes 0–3 of the information field, these bytes must be the same as the defined format of FIG. 6. If the information field is checked and found to be different from the defined format, a link-protocol error is detected. Bytes 4–31 of the information field are set to zeros by the source of an IDR frame and are ignored by the recipient of an IDR frame. The optional checking of the node-descriptor portion of the information field and the resultant actions are further described in connection with FIGS. 10 and 11.

Figure 7:
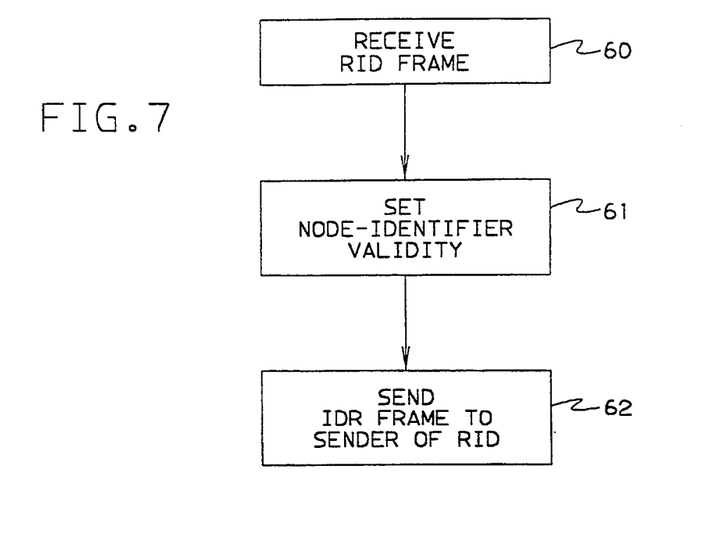
FIG. 7 is a logic flow diagram of the sending of an IDR frame by a link-level facility in response to the receipt of an RID frame.

FIG. 7 is a block diagram that shows the logic flow of a link-level facility in response to the receipt of an RID frame. At 60, when a link-level facility receives an RID frame, the link-level facility determines the node-identifier validity, and at 61 sets the appropriate node-ID validity code in the flag field of the node descriptor (see FIG. 12). If, while obtaining its node identifier, the link-level facility detects an error or determines for some other reason that the node-descriptor information is suspect (that is, not valid), then the link-level facility at 61 sets the node-ID validity code to the value 2 in the flag field of the node descriptor to be sent in the IDR frame.

In the response to an RID frame, the link-level facility sends an IDR frame at 62 having a node-ID validity code of either 0 or 2 in the flag field of the node descriptor. Since the link-level facility's node descriptor must be either valid or not valid, a node-ID validity code of 1 is never sent in an IDR frame.

The recipient of the IDR frame is not required to check the node-ID validity code in the flag field unless the link-level facility requires valid node-identifier information of its neighbor to continue the initialization process, as will now be discussed.

An initialization process establishes the necessary conditions for elements of a channel path to be able to sustain both link-level and device-level communication. For each channel link-level facility or control-unit link-level facility that is part of a channel path, the initialization process may be thought of as a series of hierarchical steps. At each step, a procedure is performed in the specified sequence until the procedure is completed.

Figure 8:
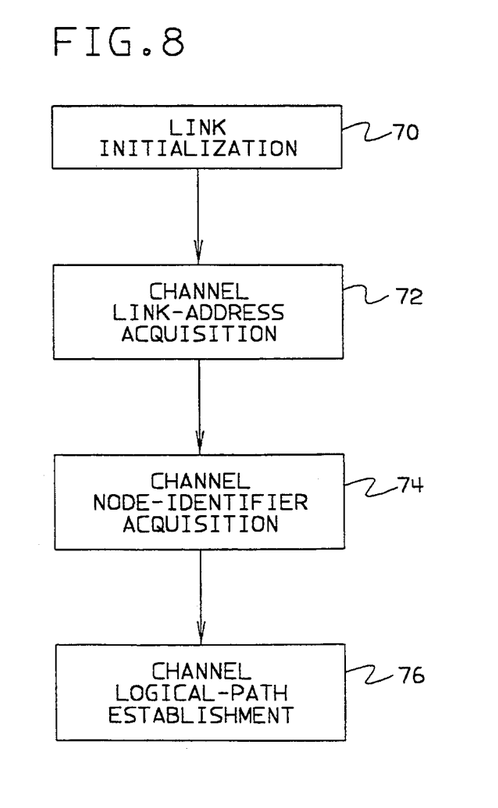
FIG. 8 is a logic flow diagram of the initialization procedure for a channel link-level facility.

FIG. 8 is a block diagram showing the flow of an initialization procedure for a channel link-level facility such as the channels 22 and 24 of FIG. 1. At 70, the channel does a link initialization which initializes the channel in accordance with the link protocols as described in Serial I/O Architecture Ordered-Set/Sequence Reception and Protocol for Managing Sequences, IBM Technical Disclosure Bulletin, Vol. 33, No. 10B, Pages 287–197, March 1991. At 72, the channel performs a channel link-address acquisition procedure as described in Acquiring Addresses in an Input/Output System, U.S. patent application Ser. No. 07/576,657 filed Aug. 31, 1990, owned by the assignee of the present invention. At 74, the channel performs a channel node-identifier acquisition procedure. The channel node-identifier-acquisition procedure provides a means by which the channel link-level facility can acquire the neighboring-node identifier. The neighboring-node identifier refers to the identification of the node attached to the other end of the link. The channel node-identifier-acquisition procedure will be further explained herein in connection with FIG. 10. At 76, the channel completes initialization by performing a channel logical-path establishment procedure as described in Logical Channel Paths in a Computer I/O System, U.S. patent application Ser. No. 07/576,561, filed Aug. 31, 1990, owned by the assignee of the present invention.

Figure 9:
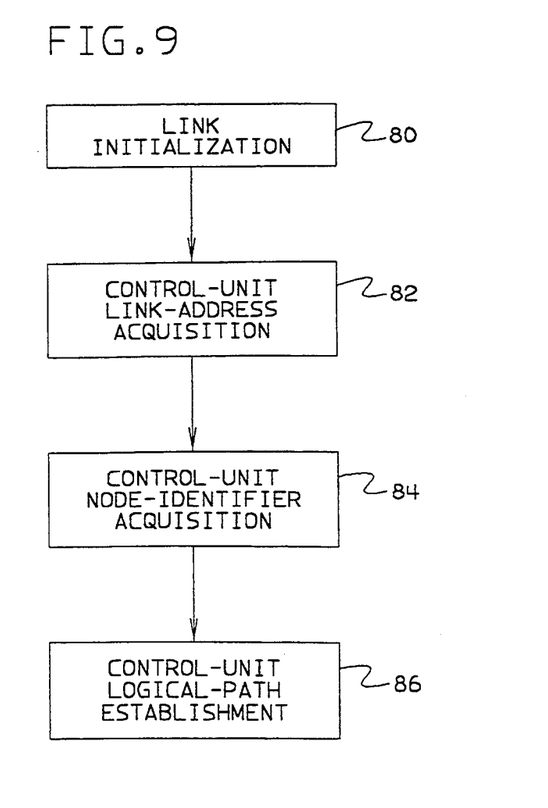
FIG. 9 is a logic flow diagram of the initialization procedure for a control-unit link-level facility.

FIG. 9 is a block diagram showing the flow of the initialization procedure for the control-unit link-level facility. The control units 26–29 and the switch control unit 20 perform this initialization procedure. At 80, the control unit link initialization procedure is performed. This initialization procedure is similar to that performed at 70 as discussed in FIG. 8. At 82, the control-unit link-address acquisition is performed as discussed in the mentioned patent application titled Acquiring Addresses in an Input/Output System. At 84, the control-unit node-identifier-acquisition procedure is performed by which a control-unit link-level facility can acquire the neighboring node identifier. The control-unit node-identifier-acquisition procedure will be further explained herein in connection with FIG. 11. At 86, the control unit completes initialization by performing the control-unit logical-path-establishment procedure as described in the mentioned patent application titled Logical Channel Paths in a Computer I/O System.

The control-unit link-level facility establishes a logical path at the request of the channel link-level facility as explained in the mentioned patent application titled Logical Channel Paths in a Computer I/O System.

If a procedure encounters a link-busy condition, the procedure is retried until either the link-busy condition no longer exists and the procedure is successful or a condition other than a link-busy condition is encountered, in which case, the protocols defined for that condition determine the action to be taken. The retry for a link-busy condition can be deferred until attempts to complete the procedure with other link-level facilities have been made.

If a procedure is not successful because of a link error or port-reject frame, the procedure is retried. The number of retries performed beyond one because of a link error or port-reject may be defined, as desired. If the procedure is not successful with the last retry, that portion of the initialization process is terminated and all or a portion of the channel link-level facility or control-unit link-level facility is considered uninitialized, depending on which initialization procedures were not successful. A subsequent operation or function that requires a previously unsuccessful initialization procedure to be completed causes the unsuccessful procedure to be retried. If the procedure is successful when retried, the remaining unperformed procedures are attempted. If the remaining procedures are successful, the operation or function is attempted on the channel path. If the procedure is not successful when retried, the operation procedures are not attempted, and the operation or the function is not attempted on the channel path.

The hierarchy of initialization steps shown in FIGS. 8 and 9 are also followed when there is an error or other event that causes regression within the initialization process. When an error or other event indicates that the results achieved at a previously completed step are no longer valid, information associated with that step and possible subsequent steps in the hierarchy are discarded or may be considered no longer current for node-identifier information, and the initialization process for the affected link-level facility or dynamic-switch port is repeated for all affected steps.

A no-longer--current node identifier is an identification of the last known node attached to the link-level facility, but as the result of some event, such as the loss-of-signal condition, may not reflect the current attached node, since a configuration change may have occurred. For example, if a control-unit link-level facility observes that a link which was previously considered operational is now not operational because of a loss-of-signal condition which has persisted for longer that the link-interval duration, then the control-unit link-level facility becomes unidentified, removes any logical paths established for that link, and may discard the neighboring-node identifier or may consider the neighboring-node identifier to be no longer current. For this situation, the initialization process would start again with the link-initialization procedure when the loss-of-signal condition no longer exists.

Figure 10:
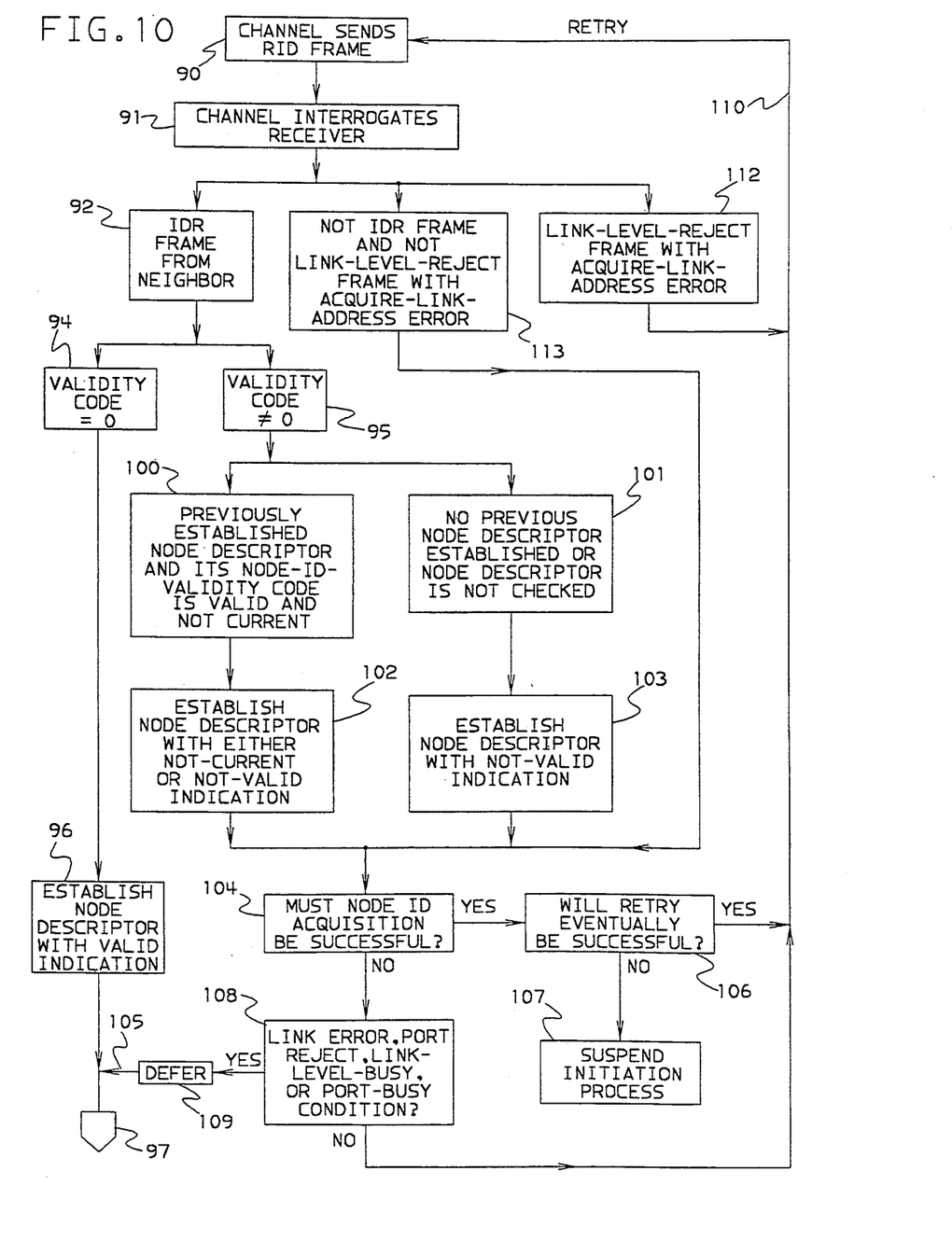
FIG. 10 is a logic flow diagram of a channel node-identifier acquisition procedure.

FIG. 10 is a block diagram showing the flow of the channel node-identifier-acquisition procedure 74 of FIG. 8.

At 90, the channel link-level facility attempts to acquire the neighboring node identifier by sending a request-node-identifier (RID) frame as soon as the channel has acquired its link address. The RID frame is a link-control frame, as previously described. At 91, the channel link-level facility checks the receiver for the response to the RID frame sent at 90. At 92, the neighboring link-level facility's response is an identifier-response frame (IDR) containing the node-identifier information and a check of the node-ID-validity code is made at 94 and 95. The IDR frame is a link-control frame, as previously described.

When the response recognized at 91 is a link-level-reject frame with an acquire-link-address error as shown at 112, the channel link-level facility retries channel node-identifier acquisition at 110.

When nothing or an error is received at 91, or the response recognized at 91 is not an IDR frame or not a link-level-reject frame with an acquire-link-address error as shown at 113, the channel link-level facility checks to determine if the channel requires successful node-identifier acquisition at 104.

At 94 and 95, the channel link-level facility checks the node-ID-validity code in the node descriptor-flag field of the received IDR frame. When the node-ID-validity code is zero as shown at 94, the channel link-level facility establishes the received 32-byte node descriptor as the node descriptor of its neighbor with an indication of valid at 96, and channel node-identifier acquisition is complete. The node-identifier-acquisition procedure is then exited at 97, and the channel initialization procedure is continued as previously described.

When the node-ID-validity code is not zero as shown at 95, the following conditions are checked at 100 and 101. When a node descriptor has been previously established and its node-ID-validity code indicates valid and not current as shown at 100, the channel link-level facility either establishes the present node descriptor as its neighbor with an indication of valid and not current or establishes the node descriptor with an indication of not valid at 102. When a node descriptor has not been previously established or a previously established node descriptor is not checked as shown at 101, the channel link-level facility establishes the node descriptor with an indication of not valid at 103.

After the functions at 102, 103, or 113 a check is made at 104 to determine if the channel requires successful node-identifier acquisition. When the channel does not require the information contained in the node identifier of its neighbor and deferral is permissible, the channel link-level facility is permitted to continue initialization of this and other control-unit link-level facilities, if appropriate, on the channel path even if the attempt to acquire the node identifier of its neighbor was unsuccessful. A check is made at 108 to determine if a link error, a port-reject condition, a link-level-busy condition, or a port-busy condition occurred. When any of these conditions exist at 108, the retry of channel node-identifier acquisition may be deferred at 109, until these conditions no longer exist. When these conditions do not exist, a retry of channel node-identifier acquisition is attempted, as shown at 110.

Deferral of channel node-identifier acquisition and the continuation of the initialization process as represented at 105, provides that the lack of success in acquiring a valid and current node identifier need not prevent the establishment of logical paths or the execution of link-level and device-level functions.

When the channel requires the information contained in a valid and current node identifier of its neighbor, a check is made at 106 to determine if a retry will be successful. When there is reason to expect that a retry will eventually be successful, the channel link-level facility retries channel node-identifier acquisition until a valid and current node-identifier is acquired, as shown at 110. When there is reason to suspect that subsequent retries will not be successful, the initialization process is suspended at 107.

If the channel has to provide node descriptors in a function such as link-incident reporting prior to acquisition of a valid and current node descriptor, the channel sends the node descriptor of its neighbor with a node-ID-validity code of 1 (valid and not current) or 2 (not valid), as appropriate.

When a condition occurs that causes regression into the channel link-address-acquisition portion of the initialization process for a link, the channel link-level facility may discard the neighboring node identifier or may consider the neighboring node identifier to be no longer current, as has been explained. When conditions permit, the channel link-level facility attempts to acquire the current node identifier of the attached node.

Figure 11:
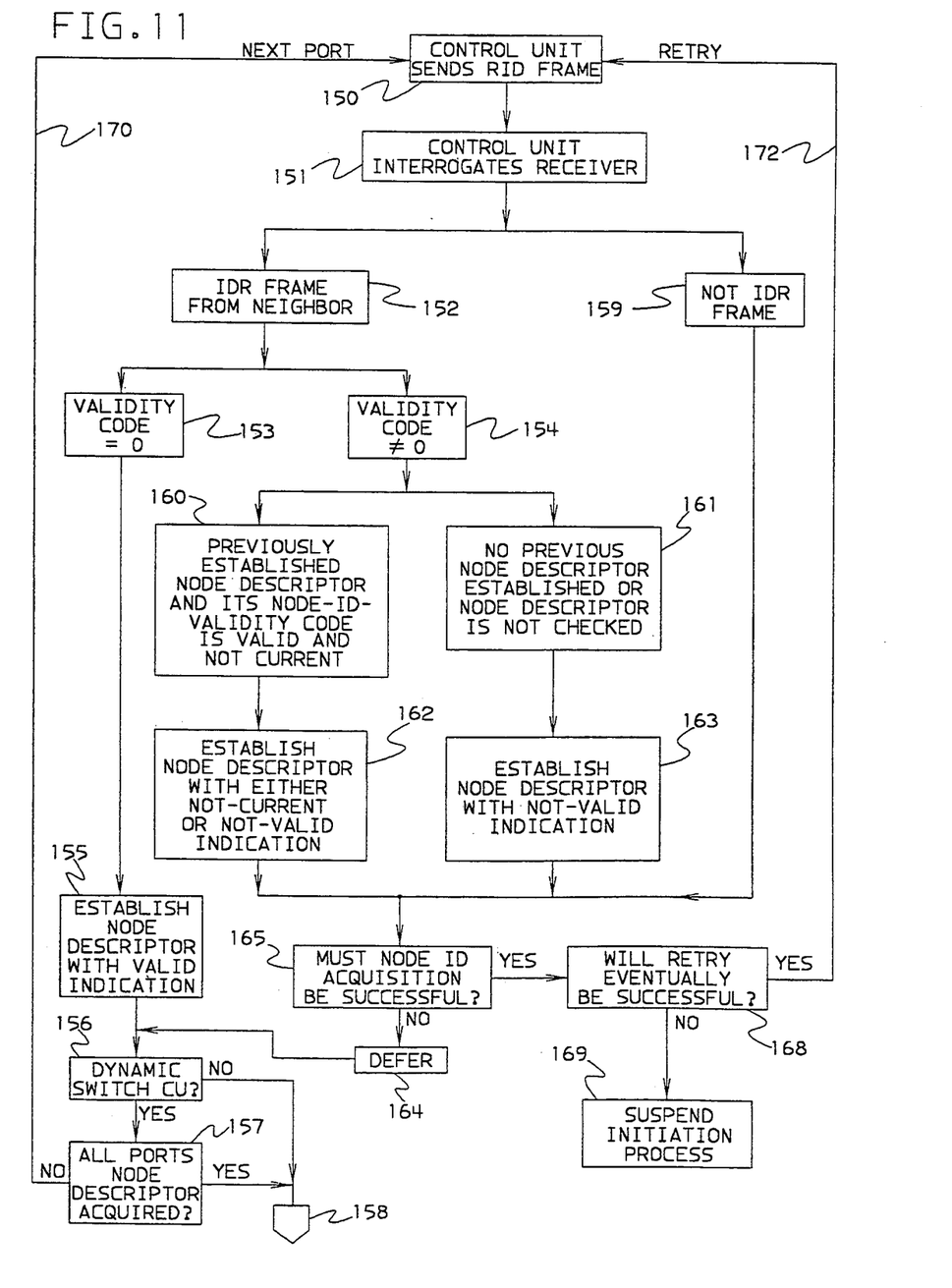
FIG. 11 is a logic flow diagram of a control-unit node-identifier acquisition procedure.

FIG. 11 is a block diagram showing the flow of the control-unit node-identifier-acquisition procedure 84 of FIG. 9.

At 150, the control-unit link-level facility attempts to acquire the neighboring node identifier by sending a request-node-identifier (RID) frame. The RID frame is a link-control frame, as previously described. At 151, the control-unit link-level facility checks the receiver for the response to the RID frame sent at 150. At 152, the neighboring link-level facility's response is an identifier-response frame (IDR) containing the node-identifier information and a check of the node-ID-validity code is made at 153 and 154. The IDR frame is a link-control frame, as previously described.

When nothing or an error is received at 151, or the response recognized at 151 is not an IDR frame as shown at 159, the control-unit link-level facility checks to determine if the control unit requires successful node-identifier acquisition at 165.

At 153 and 154, the control-unit link-level facility checks the node-ID-validity code in the node-descriptor-flag field of the received IDR frame. When the node-ID-validity code is zero as shown at 153, the control-unit link-level facility establishes the received 32-byte node descriptor as the node descriptor of its neighbor with an indication of valid at 155, and performs the checks at 156 and 157.

At 156 a check is made to determine if the control unit is a dynamic-switch control unit. When the control unit is not a dynamic-switch control unit, control-unit node-identifier acquisition is complete. The node-identifier-acquisition procedure is then exited at 158, and the control-unit initialization procedure is continued as previously described. When the control unit is a dynamic-switch control unit, a check is made at 157 to determine if all ports have acquired the neighboring node identifier. When all ports have acquired the neighboring node identifier, control-unit node-identifier acquisition is complete. The node-identifier-acquisition procedure is then exited at 158, and the control-unit initialization procedure is continued as previously described. When all ports have not acquired the neighboring node identifier, control-unit node-identifier acquisition is repeated for the next port as shown at 170.

When the node-ID-validity code is not zero as shown at 154, the following conditions are checked at 160 and 161. When a node descriptor has been previously established and its node-ID-validity code indicates valid and not current as shown at 160, the control-unit link-level facility either establishes the present node descriptor as its neighbor with an indication of valid and not current or establishes the node descriptor with an indication of not valid at 162. When a node descriptor has not been previously established or a previously established node descriptor is not checked as shown at 161, the control-unit link-level facility establishes the node descriptor with an indication of not valid at 163.

After the functions at 159, 162, or 163 a check is made at 165 to determine if the control unit requires successful node-identifier acquisition. When the control unit does not require the information contained in the node identifier of its neighbor, the control-unit link-level facility is permitted to continue initialization of the control-unit link-level facility even if the attempt to acquire the node identifier was unsuccessful, that is, the retry of control-unit node-identifier acquisition may be deferred at 164.

Deferral of control-unit node-identifier acquisition and the continuation of the initialization process as represented at 171 provides that the lack of success in acquiring a valid and current node identifier need not prevent the establishment of logical paths or the execution of link-level and device-level functions.

When the control unit requires the information contained in a valid and current node identifier of its neighbor, a check is made at 168 to determine if a retry will be successful. When there is reason to expect that a retry will eventually be successful, the control-unit link-level facility retries control-unit node-identifier acquisition until a valid and current node-identifier is acquired, as shown at 172. When there is reason to suspect that subsequent retries will not be successful, the initialization process is suspended at 169.

If the control unit has to provide node descriptors in a function such as link-incident reporting prior to acquisition of a valid and current node descriptor, the control unit sends the node descriptor of its neighbor with a node-ID-validity code of 1 (valid and not current) or 2 (not valid), as appropriate.

When a condition occurs that causes regression into the control-unit link-address-acquisition portion of the initialization process for a link, the control-unit link-level facility may discard the neighboring node identifier or may consider the neighboring node identifier to be no longer current, as has been explained. When conditions permit, the control-unit link-level facility attempts to acquire the current node identifier of the attached node.

The dynamic-switch control unit 20 attempts to acquire the node identifier of the link-level facility attached to each port of the dynamic switch 10. Each of the link-Level facilities of the control units 26-29 attempt to acquire the node identifier of the attached node.

Figure 12:
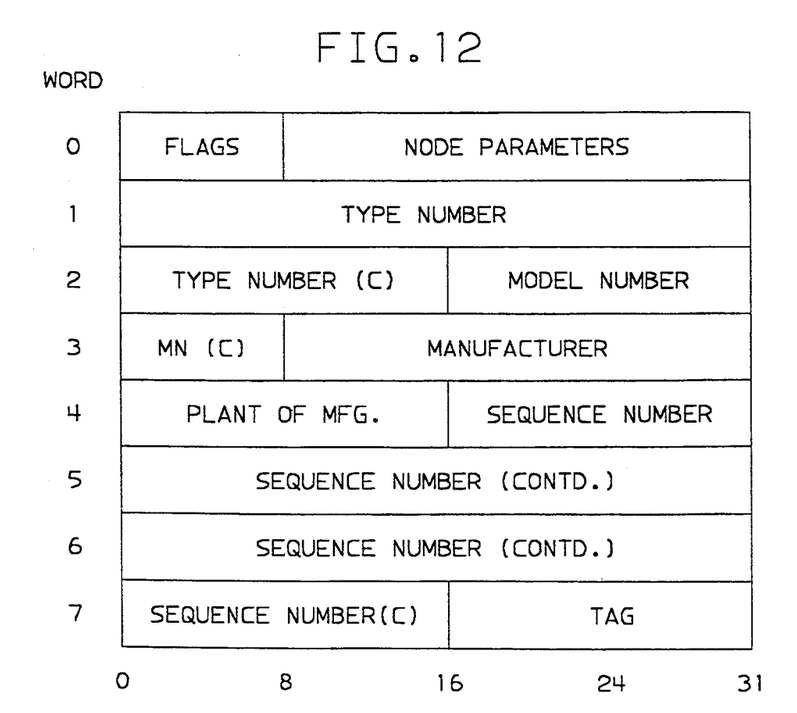
FIG. 12 shows the format and content of the node descriptor of a node of the I/O system of FIG. 1 for use in the IDR information field of FIG. 6.

FIG. 12 is a chart showing the contents of the node descriptor that is stored in the link level facility and supplied in an IDR frame responsive to an IDR frame, as previously described. The node descriptor is designed such that it is a worldwide-unique description of the node such that each node defined to a computer I/O system is unique to only one node. The node descriptor is a 32 byte field that is included in the information field 42 of an IDR frame.

Collectively, the 28 bytes of information contained in words 1–7 of the node descriptor provide a worldwide-unique node identifier (node ID). the node ID is composed of two parts:

1. Self describing product (SDP) ID. The first 26 bytes of the node ID identify the SDP containing the interface that determines the node. The SDP ID corresponds to the information provided on the serial-number plate attached to the external surface of the SDP.

2. Interface ID (tag). The last two bytes of the node ID contain an interface identifier (ID) that uniquely identifies the physical location of the associated SDP interface.

Node IDs with the same SDP ID must not use the same interface ID.

Flags: Byte 0 of word 0 describes the manner in which selected fields of the node descriptor are to be interpreted. The meaning of bits 0–7 is as follows:

Bits Description

0–2 Node-ID validity. Bits 0–2 contain a three-bit code that describes the validity of the node ID contained in words 1–7. The codes and their meanings are as follows:
  0 Node ID is valid.
  1 Node ID is valid, however, it may not be current. This value is used when the SDP has obtained the requested node ID but subsequently has observed some event (such as the loss of signal on a link) which may have resulted in a configuration change. The SDP has been unable to obtain the node ID again.
  2 Node ID is not valid. The SDP is unable to obtain the requested node ID. Except for the node-ID-validity field, the contents of the node descriptor have no meaning.
  3–7 Reserved.
3 Node type. When zero, bit 3 specifies that the node described by this node descriptor is a device-type node: when one, this node is a channel-subsystem-type node.
4–7 Reserved.

Node Parameters: Bytes 1–3 of word 0 contain additional information about the node. When bit 3 of the flag field is zero, indicating that this is a device-type node, the contents of bytes 1–3 of word 0 are as follows:

Byte Description

1 Reserved and set to zero.
2 Class. Byte 2 of word 0 contains an eight-bit code that specifies the class to which the device belongs. The codes and their meanings are as follows:
  0 Unspecified class
  1 Direct access storage
  2 Magnetic tape
  3 Unit record (input)
  4 Unit record (output)
  5 Printer
  6 Communications controller
  7 Terminal (full screen)
  8 Terminal (line mode)
  9 Standalone channel-to-channel adapter
  10 Switch
  11–255 Reserved
Reserved and set to zero.

When bit 3 of the flag field is one, indicating that this is a channel-subsystem-type node, the contents of bytes 1–3 of word 0 are as follows:

Byte Description

1 Reserved and set to zero
2 Class. Byte 2 of word 0 contains an eight-bit code that specifies the class to which the interface belongs. The codes and their meanings are as follows:
  0 Unspecified class
  1 Channel path
  2 Integrated channel-to-channel adapter
  3–255 Reserved
3 Identification. Byte 3 of word 0 contains the channel path ID of the channel path that contains; the specified interface.

The contents of the following five fields correspond to the information provided on a serial-number plate attached to the external surface of the SDP.

Type Number: Word 1 and bytes 0–1 of word 2 contain the six-character (0–9) EBCDIC type number of the SDP. The type number is right justified with leading EBCDIC zeros if necessary.

Model Number: Bytes 2–3 of word 2 and byte 0 or word 3 contain, if applicable, the three-character (0–9 or uppercase A–Z) EBCDIC model number of the SDP. The model number is right justified with leading EBCDIC zeros if necessary.

Manufacturer: Bytes 1–3 of word 3 contain a three-character (0–9 or uppercase A–Z) EBCDIC code that identifies the manufacturer of the SDP, for example, "IBM."

Plant of Manufacture: Bytes 0–1 of word 4 contain a two-character (0–9 or uppercase A–Z) EBCDIC plant code that identifies the plant of manufacture for the SDP.

Sequence Number: Bytes 2–3 of word 4, words 5–6, and bytes 0–1 of word 7 contain the 12-character (0–9 or uppercase A–Z) EBCDIC sequence number of the SDP. The sequence number is right justified with leading EBCDIC zeros if necessary.

A serial number consists of the concatenation of the plant-of-manufacture designation with the sequence-number designation.

Tag: Bytes 2–3 of word 7 contain the physical identifier for the SDP interface that is identified by the preceding 26 bytes of node descriptor.

The described node-identifier obtained in the described node-identifier acquisition procedures is particularly useful in the inventory of the components of a configuration which can be assembled and maintained under program control, determining the interconnections of a configuration, determining whether the actual configuration at initialization matches a predefined configuration, determining, after a malfunction such as loss of signal on a serial-I/O interface, whether the restored configuration matches the configuration that existed before the malfunction, and providing unique identification of failing components under program control, among others. Some of these procedures are described in the following U.S. patent applications owned by the assignee of the present invention:

U.S. patent application Ser. No. 07/444,190 filed Oct. 28. 1989 for Methods and Apparatus for Dynamically Managing Input/Output (I/O) Connectivity;

U.S. patent application Ser. No. 07/516,387 filed Apr. 30, 1990 for Methods and Apparatus for Performing Fault Isolation and Failure Analysis in Link-Connected Systems;

U.S. patent application Ser. No. 07/577,448 filed Sep. 4, 1990 for Method and Apparatus for Verifying the Configuration of a Link-Connected Network; and U.S. patent application Ser. No. 07/676,603 filed Mar. 28, 1991 for Method and Apparatus for Dynamic Changes to System I/O Configuration.

It will be understood that, while one of the uses of the present invention is to acquire the node-identifier of the nearest neighbor, any link-level facility may acquire the node-identifier of any other link-level facility that it may communicate with by use of the destination address 50 in the RID frame. The addressed link-level facility then returns its node-identifier to the requesting link-level facility by using the source address 52 of the RID frame as the destination address 50 of the IDR frame.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. In a computer system having a plurality of communicating nodes in a network of communicating nodes, in which each of said communicating node has a unique identifier which does not change if a node location is later changed in the network, the method comprising the steps of:

communicating by any node with not more than one neighboring node at a time in a selected transmission direction without requiring an identifier of the neighboring node for requesting the identifier of the neighboring node;

sending by a requesting node of a request-identifier frame to the one neighboring node in the selected transmission direction within the network of communication nodes;

transmitting by the neighboring node of an identifier-response frame to said requesting node in response to the sending step, said identifier-response frame including a validity code for indicating if the identifier-response frame contains a valid identifier of the neighboring node;

returning by the neighboring node of a not-available-indicator value in a valid field of the identifier-response frame if a previously established identifier for the neighboring node is not available to the neighboring node, returning by the neighboring node of an available-indicator value in the valid field if the identifier of the neighboring node is available to the neighboring node;

repeating the sending step by the requesting node if said not-available-indicator value in the identifier-response frame is received by the requesting node; and suspending the sending step when the repeating step is unsuccessful.

2. The method of claim 1 in which said request-identifier frame contains: a destination address field which need not contain any neighboring node address or identifier, and a source address field which contains an identifier of said requesting node;

said identifier-response frame contains: a destination field which contains an address of said requesting node and a source field which contains any address or identifier available to the neighboring node; and said sending and transmitting steps respectively including information for routine said request-identifier frame and said identifier-response frame between the requesting node and the neighboring node.

3. The method of claim 1 further comprising the steps of testing a link between said requesting node and said neighboring node; and repeating the sending step if said link is operational and deferring the repeating step if said link is not operational.

4. The method defined in claim 1 further comprising step of:

initializing a network in an input/output system of a computer system;

assigning an identifying address to each of said communicating node which is one of: a central processing unit, an input/output unit switch, and a control unit.

5. The method of claim 1 wherein sending the identifier of said neighboring node includes sending a worldwide unique identifier.

6. The method of claim 5 wherein said worldwide unique identifier includes an identification of a self describing product that determines said neighboring node.

7. The method of claim 6 wherein said worldwide unique identifier includes a field which identifies a product.

8. The method of claim 7 wherein said identification includes a serial-number field that contains information provided on a serial-number plate attached to an external surface of the product.

9. The method of claim 8 wherein said worldwide unique identifier includes an interface tag that uniquely identifies a physical location of an interface associated with said product.

* * * * *